US010479164B2

United States Patent
Ryu et al.

(10) Patent No.: US 10,479,164 B2
(45) Date of Patent: Nov. 19, 2019

(54) AIR CONDITIONING SYSTEM FOR VEHICLE (71) Applicant: HANON SYSTEMS, Daejeon (KR)

(72) Inventors: Jae Chun Ryu, Daejeon (KR); Tae Yong Park, Daejeon (KR); Yong Nam Ahn, Daejeon (KR); Sung Je Lee, Daejeon (KR); Se Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/565,924

(22) PCT Filed: Apr. 14, 2016

(86) PCT No.: PCT/KR2016/003869
§ 371 (c)(1),
(2) Date: Oct. 12, 2017

(87) PCT Pub. No.: WO2016/167558
PCT Pub. Date: Oct. 20, 2016

(65) Prior Publication Data
US 2018/0111445 A1    Apr. 26, 2018

(30) Foreign Application Priority Data

Apr. 14, 2015  (KR) .................. 10-2015-0052191
Apr. 14, 2016  (KR) .................. 10-2016-0045302

(51) Int. Cl.
B60H 1/00     (2006.01)
F04D 27/02    (2006.01)
F04D 29/42    (2006.01)

(52) U.S. Cl.
CPC ..... *B60H 1/00471* (2013.01); *B60H 1/00028* (2013.01); *F04D 27/0246* (2013.01);
(Continued)

(58) Field of Classification Search
CPC ............ B60H 1/00328; B60H 1/00471; B60H 1/3204; B60H 2001/00058;
(Continued)

(56) References Cited

U.S. PATENT DOCUMENTS 4,802,405 A *  2/1989  Ichitani .............. B60H 1/00007
                                               165/100
5,115,727 A    5/1992  Becquerel
(Continued)

FOREIGN PATENT DOCUMENTS

JP    2004182224 A    7/2004

OTHER PUBLICATIONS

International Search Report and Written Opinion dated Jul. 25, 2016 from International Patent Application Serial No. PCT/KR2016/003869, with English translation of International Search Report.

Primary Examiner — Paul Alvare
Assistant Examiner — Hans R Weiland
(74) Attorney, Agent, or Firm — Dickinson Wright PLLC (57) ABSTRACT The present invention provides an air conditioning system for a vehicle, which includes an evaporator mounted in a cold air passageway and a condenser mounted in a warm air passageway inside an air-conditioning case to perform cooling and heating, and protecting means for surrounding a plurality of electronic units mounted on the outer surfaces of the air-conditioning case and blowers, thereby preventing breakdowns and malfunctions by preventing foreign matters or water from entering into the electronic units.

8 Claims, 11 Drawing Sheets (52) U.S. Cl.
CPC ..... *F04D 29/4213* (2013.01); *F04D 29/4226* (2013.01); *B60H 2001/00085* (2013.01); *B60H 2001/00614* (2013.01)

(58) Field of Classification Search
CPC ........... B60H 2001/00614; B60H 2001/00621; B60H 1/00028; B60H 2001/00078; B60H 1/00021; F04D 27/0246; F04D 29/4213; F04D 29/4226
See application file for complete search history.

(56) References Cited

U.S. PATENT DOCUMENTS

| | | | | |
|---|---|---|---|---|
| 6,318,103 | B1* | 11/2001 | Rieger | B60H 1/00521 |
| | | | | 361/715 |
| 6,332,759 | B1* | 12/2001 | Guillemin | B60H 1/00507 |
| | | | | 417/366 |
| 6,397,609 | B1* | 6/2002 | Shikata | B60H 1/00514 |
| | | | | 361/701 |
| 6,789,999 | B2* | 9/2004 | Bikos | B60H 1/00471 |
| | | | | 415/206 |
| 7,931,075 | B2* | 4/2011 | Ito | B60H 1/00028 |
| | | | | 165/122 |
| 8,118,087 | B2* | 2/2012 | Saida | B60H 1/00828 |
| | | | | 165/202 |
| 2011/0162409 | A1* | 7/2011 | Okumura | B60H 1/00842 |
| | | | | 62/498 |
| 2012/0241126 | A1 | 9/2012 | Kishi | |
| 2012/0247714 | A1 | 10/2012 | Morris et al. | |
| 2015/0082820 | A1* | 3/2015 | Takahashi | B60H 1/0005 |
| | | | | 62/238.7 |

* cited by examiner

FIG. 1

PRIOR ART

FIG. 2

PRIOR ART

AIR CONDITIONING SYSTEM FOR VEHICLE

CROSS-REFERENCE TO RELATED APPLICATIONS

This application is a U.S. National Stage of International Application No. PCT/KR2016/003869, filed Apr. 14, 2016, which claims the benefit and priority of KR 10-2015-0052191 filed Apr. 14, 2015 and KR 10-2016-0045302 filed Apr. 14, 2016. The entire disclosures of each of the above applications are incorporated herein by reference.

TECHNICAL FIELD

The present invention relates to an air conditioning system for a vehicle, and more particularly, to an air conditioning system for a vehicle, which includes an evaporator mounted in a cold air passageway and a condenser mounted in a warm air passageway inside an air-conditioning case to perform cooling and heating, and protecting means for surrounding a plurality of electronic units mounted on the outer surfaces of the air-conditioning case and blowers.

BACKGROUND ART

Figure 1:
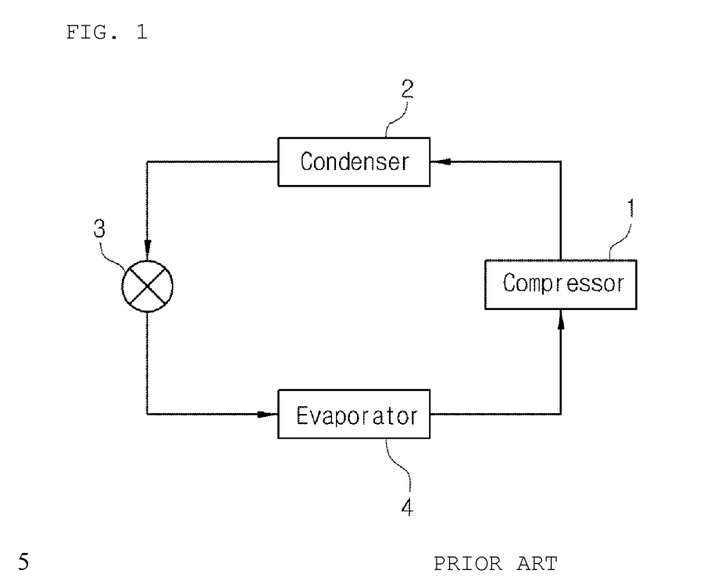
FIG. 1 is a configurative view showing a refrigeration cycle of a conventional air conditioning system for a vehicle.

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses vapor-phase refrigerant of low-temperature and low-pressure while driving by driving power of an engine or a motor, and then sends the refrigerant in the gaseous phase of high-temperature and high-pressure to the condenser 2. Then, the condenser 2 condenses the vapor-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the vapor-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown) which is mounted inside the air-conditioning case and through which coolant of the engine circulates or by an electric heater (not shown) mounted inside the air-conditioning case.

In the meantime, the condenser 2 is mounted at the front side of the vehicle to radiate heat while exchanging heat with air.

Figure 2:
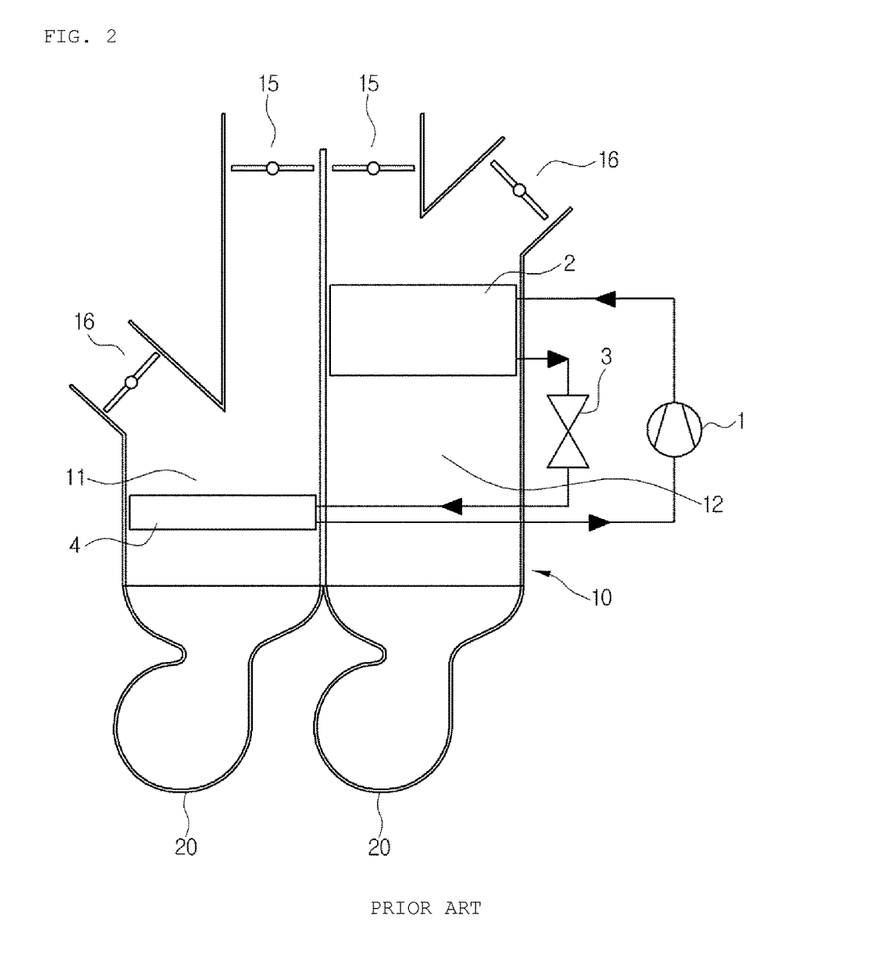
FIG. 2 is a view showing the conventional air conditioning system for a vehicle.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside one air-conditioning case 10; an evaporator 4 mounted on the cold air passageway 11 for cooling; and a condenser 2 mounted on the warm air passageway 12 for heating.

In this instance, at an outlet of the air-conditioning case 10, formed are air outflow ports 15 for supplying air to the interior of the vehicle and air discharge ports 16 for discharging air to the exterior of the vehicle.

Furthermore, blowers 20 which are operated individually are respectively mounted at an inlet of the cold air passageway 11 and at an inlet of the warm air passageway 12.

Because the cold air passageway 11 and the warm air passageway 12 are respectively arranged at the right and left, namely, in the width direction of the vehicle, the two blowers 20 are also arranged at the right and left.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

In the meantime, a plurality of electronic units (not shown) are disposed on the outer surfaces of the air-conditioning case 10 and the blowers 20. That is, an actuator (not shown) for operating doors inside the air-conditioning case 10 is mounted on the outer surface of the air-conditioning case 10, and a motor (not shown) is mounted on the outer surfaces of the blowers 20.

Of course, connectors for supplying electric power are connected to the actuator and the motor.

However, because the electronic units mounted outside the air-conditioning case 10 and the blowers 20 are exposed to the outside, there is a problem in that the air conditioning system may have breakdown and malfunction because external foreign matters or water may enter into the electronic units.

DISCLOSURE

Technical Problem

Accordingly, the present invention has been made in view of the above-mentioned problems occurring in the prior art, and it is an object of the present invention to provide an air conditioning system for a vehicle, which includes an evaporator mounted in a cold air passageway and a condenser mounted in a warm air passageway inside an air-conditioning case to perform cooling and heating, and protecting means for surrounding a plurality of electronic units mounted on the outer surfaces of the air-conditioning case and blowers, thereby preventing breakdowns and malfunctions by preventing foreign matters or water from entering into the electronic units.

Technical Solution

To accomplish the above object, according to the present invention, there is provided an air conditioning system for a vehicle including: a blower unit which is mounted at an inlet of an air-conditioning case and has blowers to blow air; electronic units which are mounted on the outer surfaces of the air-conditioning case and the blower unit in order to control components mounted on the air-conditioning case and the blower unit; and protecting means mounted on the outer surface of at least one of the air-conditioning case and the blower unit to protect the electronic units.

ADVANTAGEOUS EFFECTS

As described above, the air conditioning system for a vehicle according to the preferred embodiment of the present invention can prevent breakdowns and malfunctions by preventing foreign matters or water from entering into the electronic units, because including the evaporator mounted in the cold air passageway and the condenser mounted in the warm air passageway inside the air-conditioning case to perform cooling and heating, and the protecting means for surrounding a plurality of electronic units mounted on the outer surfaces of the air-conditioning case and the blowers.

Moreover, the air conditioning system for a vehicle according to the preferred embodiment of the present invention can protect a plurality of the electronic units because the single protective cover surrounds the electronic units and reduce assembling processes, weight and manufacturing costs by reducing the number of protective covers.

MODE FOR INVENTION

Reference will be now made in detail to the preferred embodiment of the present invention with reference to the attached drawings.

As shown in the drawings, an air conditioning system for a vehicle according to the present invention includes a compressor (not shown), a condenser 102, expansion means (not shown) and an evaporator 104, which are connected with one another in order through a refrigerant circulation line (not shown), so as to carry out cooling through the evaporator 104 and carry out heating through the condenser 102.

First, the compressor inhales and compresses vapor-phase refrigerant of low-temperature and low-pressure discharged from the evaporator 104 while operating by receiving a driving force from a power supply, such as an engine or a motor, and then, discharges the refrigerant in a vapor phase of high-temperature and high-pressure.

The condenser 102 exchanges heat between the vapor-phase refrigerant of high-temperature and high-pressure, which is discharged from the compressor and flows inside the condenser 102, and air passing through the condenser 102, and in this instance, the refrigerant is condensed and the air is heated to be changed into warm air.

Such a condenser 102 may have a structure that the refrigerant circulation line (refrigerant pipe) is arranged in the form of a zigzag and a radiation fin (not shown) is mounted or a structure that a plurality of tubes (not shown) are stacked up and a radiation fin is mounted between the tubes.

Therefore, the vapor-phase refrigerant of high-temperature and high-pressure discharged from the compressor exchanges heat with the air to be condensed while flowing along the zigzag-shaped refrigerant circulation line or the tubes, and in this instance, the air passing through the condenser 102 is heated to be changed into warm air.

Moreover, the expansion means (not shown) rapidly expands liquid-phase refrigerant, which flows after being discharged from the condenser 102, by throttling effect and sends the expanded refrigerant in a saturated state of low-temperature and low-pressure to the evaporator 104.

The expansion means may be an expansion valve or an orifice structure.

The evaporator 104 evaporates the liquid-phase refrigerant of low-pressure, which flows after being discharged from the expansion means, by exchanging heat between the liquid-phase refrigerant and the inside air of the air-conditioning case 110 so as to cool the air due to a heat absorption by an evaporative latent heat of the refrigerant.

Continuously, the vapor-phase refrigerant of low-temperature and low-pressure evaporated and discharged from the evaporator 104 is inhaled to the compressor 100 again, and then, recirculates the above-mentioned cycle.

Furthermore, in the above-mentioned refrigerant circulation process, the air blown by a blower unit 130 is introduced into the air-conditioning case 110, is cooled by the evaporative latent heat of the liquid-phase refrigerant circulating inside the evaporator 104 while passing through the evaporator 104, and then, is discharged to the interior of the vehicle in a cooled state, so that the interior of the vehicle is cooled.

The air blown by the blower unit 130 is introduced into the air-conditioning case 110, is heated by heat radiation of the vapor-phase refrigerant of high-temperature and high-pressure circulating inside the condenser 102 while passing through the condenser 102, and then, is discharged to the interior of the vehicle in a heated state, so that the interior of the vehicle is heated.

Furthermore, the cold air passageway 111 and the warm air passageway 112 are divided from each other inside the air-conditioning case 110 by a division wall 113 which divides the inside of the air-conditioning case 110 into an upper part and a lower part.

In other words, the cold air passageway 111 is formed at the upper part based on the division wall 113, and the warm air passageway 112 is formed at the lower part based on the division wall 113.

Additionally, the evaporator 104 is mounted in the cold air passageway 111, and the condenser 102 is mounted in the warm air passageway 112. Additionally, due to the up-and-down arrangement structure of the warm air passageway 112 and the cold air passageway 111, the condenser 102 and the evaporator 104 are also arranged up and down.

In other words, the condenser 102 and the evaporator 104 are arranged at right angles to the axial direction that rotary shafts of motors 133 and 137 of first and second blowers 130a and 130b, which will be described later, face.

Cold air flows in the cold air passageway 111 in which the evaporator 104 is mounted, and warm air flows in the warm air passageway 112 in which the condenser 102 is mounted.

In the above, the evaporator 104 is mounted above the division wall 113 and the condenser 102 is mounted below the division wall 113, but on the contrary, the evaporator 104 may be mounted below the division wall 13 and the condenser 102 may be mounted above the division wall 113.

In the meantime, the air-conditioning case 110 and the blower unit 130 may be arranged on the outer surface of a partition wall (not shown) which forms a passenger's room inside the vehicle, for instance, may be arranged in an engine room of the vehicle.

Moreover, a bypass passageway 114 which makes the cold air passageway 111 and the warm air passageway 112 communicate with each other is penetrated through the partition wall 113 between the evaporator 104 and the condenser 102, and a bypass door 115 for opening and closing the bypass passageway 114 is mounted on the bypass passageway 114.

The bypass passageway 114 bypasses some of warm air passing through the condenser 102 in the warm air passageway 112 toward the cold air passageway 111. The bypass door 115 closes the bypass passageway 114 in the cooling mode, and selectively opens and closes the bypass passageway 114 in the heating mode.

Therefore, in the state where the bypass door 115 closes the bypass passageway 114, in the cooling mode, cold air cooled by the evaporator 1004 while flowing through the cold air passageway 111 is supplied to the interior of the vehicle to carry out cooling, but in the heating mode, warm air heated by the condenser 102 while flowing through the warm air passageway 112 is supplied to the interior of the vehicle to carry out heating.

Furthermore, in the heating mode, in the case that the bypass door 115 opens the bypass passageway 114, some of the warm air heated by the condenser 102 while flowing through the warm air passageway 112 is bypassed to the cold air passageway 111 through the bypass passageway 114 to be supplied to the evaporator 104, thereby increasing air volume flowing into the evaporator 104. So, even in extremely low temperature environment, because temperature of the air introduced into the evaporator 104 rises, the evaporator 104 absorbs heat smoothly and it causes rise of refrigerant temperature and pressure inside the system and rise of temperature the air discharged to the interior of the vehicle, thereby enhancing heating performance.

Moreover, some of the warm air heated by the condenser 102 is supplied to the evaporator 104 to prevent frosting of the evaporator 104.

Furthermore, the condenser 102 is mounted above the bypass passageway 114 in an air flow direction inside the warm air passageway 112. Therefore, the warm air heated while passing through the condenser 102 can be supplied to the evaporator 104 through the bypass passageway 114.

In the meantime, the evaporator 104 is mounted below the bypass passageway 114 in the air flow direction inside the cold air passageway 111. Therefore, the warm air bypassed through the bypass passageway 114 passes through the evaporator 104.

Additionally, a blower unit 130 having blowers to blow air toward the cold air passageway 111 and the warm air passageway 112 is mounted at an inlet of the air-conditioning case 110.

The blower unit 130 includes: a first blower 130a whose a discharge port 134 is connected to an inlet 111a of the cold air passageway 111 of the air-conditioning case 110 to blow air toward the cold air passageway 111; and a second blower 130b whose a discharge port 138 is connected to an inlet 112a of the warm air passageway 112 of the air-conditioning case 110 to blow air toward the warm air passageway 112.

The first blower 130a and the second blower 130b are arranged to be spaced apart from each other and opposed to each other in the width direction of the vehicle.

Figure 11:
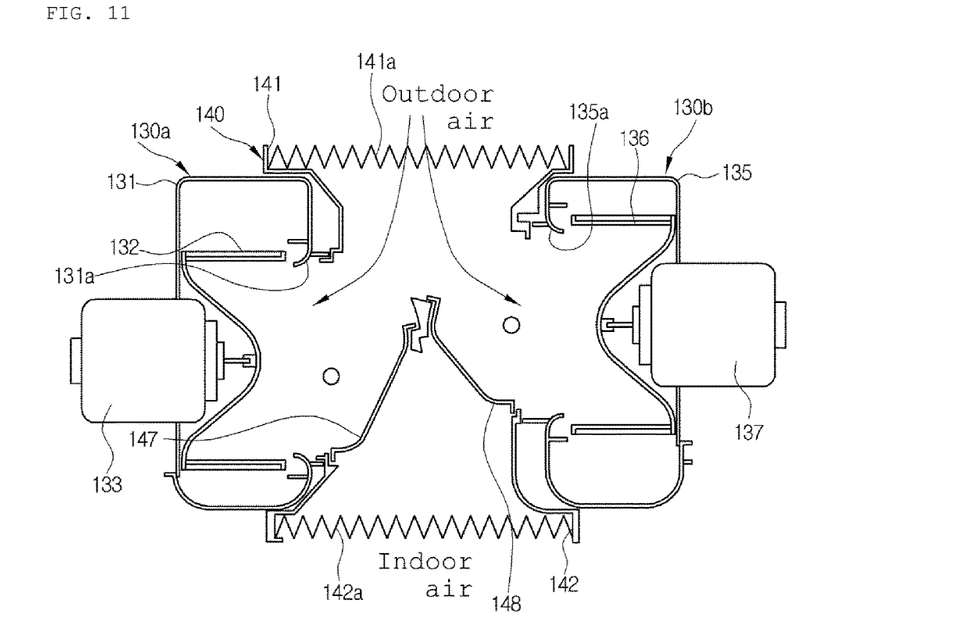
FIG. 11 is a sectional view showing the blower unit in the air conditioning system for a vehicle according to the present invention.

The first blower 130a includes: a scroll case 131 having the discharge port 134 to be connected to the inlet 111a of the cold air passageway 111 of the air-conditioning case 110; a blast fan 132 rotatably mounted inside the scroll case 131; an inlet ring 131a which is formed on one side of the scroll case 131 to introduce indoor air and outdoor air; and a motor 133 which is mounted on the other side of the scroll case 131 to rotate the blast fan 132.

The inlet ring 131a is formed on the one side of the scroll case 131 to which an intake duct 140 is combined.

The second blower 130b includes: a scroll case 135 having the discharge port 138 to be connected to the inlet 112a of the warm air passageway 112 of the air-conditioning case 110; a blast fan 136 rotatably mounted inside the scroll case 135; an inlet ring 135a which is formed on one side of the scroll case 135 to introduce indoor air and outdoor air; and a motor 137 which is mounted on the other side of the scroll case 135 to rotate the blast fan 136.

The inlet ring 135a is formed on the one side of the scroll case 135 to which an intake duct 140 is combined.

The first blower 130a and the second blower 130b are mounted in such a way that rotary shafts of the motors 133 and 137 are in the same direction.

Furthermore, the inlet ring 131a of the first blower 130a and the inlet ring 135a of the second blower 130b are formed to be opposed to each other.

Meanwhile, the scroll cases 131 and 135 of the first and second blowers 130a and 130b are formed in a scroll type around the blast fans 132 and 136 mounted inside the blowers 130a and 130b. Therefore, cross section areas of air passageways around the blast fans 132 and 136 inside the scroll cases 131 and 135 get gradually larger from a start point to an end point of a scroll.

Moreover, the discharge ports 134 and 138 of the first and second blowers 130a and 130b respectively extend from the end points of the scroll of the scroll cases 131 and 135 and are respectively connected with the cold air passageway 111 and the warm air passageway 112.

Moreover, the first blower 130a and the second blower 130b are mounted in such a way that the discharge port 134 of the first blower 130a and the discharge port 138 of the second blower 130b cross each other.

In this instance, the discharge port 134 of the first blower 130a and the discharge port 138 of the second blower 130b are arranged to cross each other vertically.

That is, in the state where the first blower 130a and the second blower 130b are arranged side by side in the width direction of the vehicle, the discharge port 134 of the first blower 130a and the discharge port 138 of the second blower 130b are arranged to cross each other vertically, such that the discharge port 134 of the first blower 130a is connected to the cold air passageway 111 and the discharge port 138 of the second blower 130b is connected to the warm air passageway 112.

Furthermore, an intake duct 140, which is connected with the first and second blowers 130a and 130b to be able to communicate with the blowers 130a and 130b, is mounted between the first blower 130a and the second blower 130b so as to supply indoor air and outdoor air to the first and second blowers 130a and 130b.

That is, one intake duct 140 is mounted between the first blower 130a and the second blower 130b, so that the first and second blowers 130a and 130b can commonly use the one intake duct 140.

As described above, because the intake duct 140 is mounted between the first blower 130a and the second blower 130b, the system using the two blowers 130a and 130b which are operated individually uses just one intake duct 140 so as to maximize space efficiency and reduce the size and manufacturing costs of the system.

The intake duct 140 includes: an outdoor air inlet 141 for introducing outdoor air; an indoor air inlet 142 for introducing indoor air; a first indoor and outdoor air converting door 147 for selectively opening the outdoor air inlet 141 and the indoor air inlet 142 relative to the first blower 130a; and a second indoor and outdoor air converting door 148 for selectively opening the outdoor air inlet 141 and the indoor air inlet 142 relative to the second blower 130b. The first indoor and outdoor air converting door 147 and the second indoor and outdoor air converting door 148 are mounted between the indoor air inlet 142 and the outdoor air inlet 141.

As shown in the drawings, preferably, the outdoor air inlet 141 is formed at an upper part of the intake duct 140 and the indoor air inlet 142 is formed at a lower part of the intake duct 140, but the positions of the outdoor air inlet 141 and the indoor air inlet 142 may be changed.

The first indoor and outdoor air converting door 147 is a dome-shaped door and is arranged at one side of the first blower 130a, and the second indoor and outdoor air converting door 148 is a dome-shaped door and is arranged at one side of the second blower 130b.

As described above, because one intake duct 140 is mounted between the first blower 130a and the second blower 130b and the two indoor and outdoor air converting doors 147 and 148 are mounted inside the intake duct 140, indoor air and outdoor air introduced into the indoor air inlet 142 and the outdoor air inlet 141 can be selectively supplied to the first blower 130a and the second blower 130b.

In the meantime, the outdoor air inlet 141 of the intake duct 140 communicates with the exterior of the vehicle, and the indoor air inlet 142 of the intake duct 140 communicates with the interior of the vehicle.

In this instance, an indoor air inflow duct 142a which connects the indoor air inlet 142 of the blower unit 130 with the interior of the vehicle is mounted on the air-conditioning case 110.

Furthermore, air filters 141a and 141b are respectively mounted on the outdoor air inlet 141 and the indoor air inlet 142 so as to remove impurities contained in the air introduced into the outdoor air inlet 141 and the indoor air inlet 142.

Additionally, at an outlet of the cold air passageway 111 of the air-conditioning case 110, disposed are a cold air outflow port 111b for discharge cold air passing through the evaporator 104 to the interior of the vehicle, a cold air discharge port 119a for discharging the cold air to the exterior of the vehicle, and a cold air mode door 120 for opening and closing the cold air outflow port 111b and the cold air discharge port 119a.

At an outlet of the warm air passageway 112 of the air-conditioning case 110, disposed are a warm air outflow port 112b for discharge warm air passing through the condenser 102 to the interior of the vehicle, a warm air discharge port 119b for discharging the warm air to the exterior of the vehicle, and a warm air mode door 121 for opening and closing the warm air outflow port 112b and the warm air discharge port 119b.

The cold air mode door 120 and the warm air mode door 121 are also dome-shaped doors.

Therefore, in the cooling mode, the cold air outflow port 111b and the warm air discharge port 119b are opened, and the air flowing the cold air passageway 111 is cooled while passing through the evaporator 104, and then, is discharged to the interior of the vehicle through the cold air outflow port 111b to cool the interior of the vehicle. In this instance, the air flowing through the warm air passageway 112 is heated while passing through the condenser 102, and then, is discharged to the exterior of the vehicle through the warm air discharge port 119b.

In the heating mode, the warm air outflow port 112b and the cold air discharge port 119a are opened, and the air flow the warm air passageway 112 is heated while passing through the condenser 102, and then, is discharged to the interior of the vehicle through the warm air outflow port 112b to heat the interior of the vehicle. In this instance, the air flowing through the cold air passageway 111 is cooled while passing through the evaporator 104, and then, is discharged to the exterior of the vehicle through the cold air discharge port 119a.

Moreover, in order to control components mounted inside the air-conditioning case 110 and the blower unit 130, electronic units are mounted on the outer surfaces of the air-conditioning case 110 and the blower unit 130.

In this instance, as shown in the drawings, because the components are mounted plural in number, the electronic units are also mounted plural in number.

For the plural components, there are the first indoor and outdoor air converting door 147, the second indoor and outdoor air converting door 148 and the blast fans 132 and 136 mounted inside the blower unit 130, the cold air mode door 120, the warm air mode door 121 and the bypass door 115 mounted inside the air-conditioning case 110, and various sensors (not shown) mounted inside the air-conditioning case 110 or the blower unit 130.

For the plural electronic units, there are a plurality of actuators 139 for respectively controlling the doors 115, 120, 121, 147 and 148, the motors 133 and 137 for controlling operations of the blast fans 132 and 136 of the first and second blowers 130a and 130b, and sensor connectors (not shown) connected to the sensors.

Of course, an actuator connector 139a for supplying electric power to the actuator 139 is connected to the actuator 139, and cable connectors 133a and 137a for supplying electric power to the motors 133 and 137 are respectively connected to the motors 133 and 137.

Moreover, protecting means 150 for protecting the electronic units is mounted on the outer surface of at least one of the air-conditioning case 110 and the blower unit 130.

The protecting means 150 is mounted in such a way that one protective cover 151 surrounds a plurality of the electronic units.

That is, the protecting means 150 has the protective cover 151, which surrounds a group of a plurality of the neighboring electronic units.

As shown in the drawing, the protective covers 151 are respectively mounted on the outer surface of the blower unit 130 and the outer surface of the air-conditioning case 110.

Figure 4:
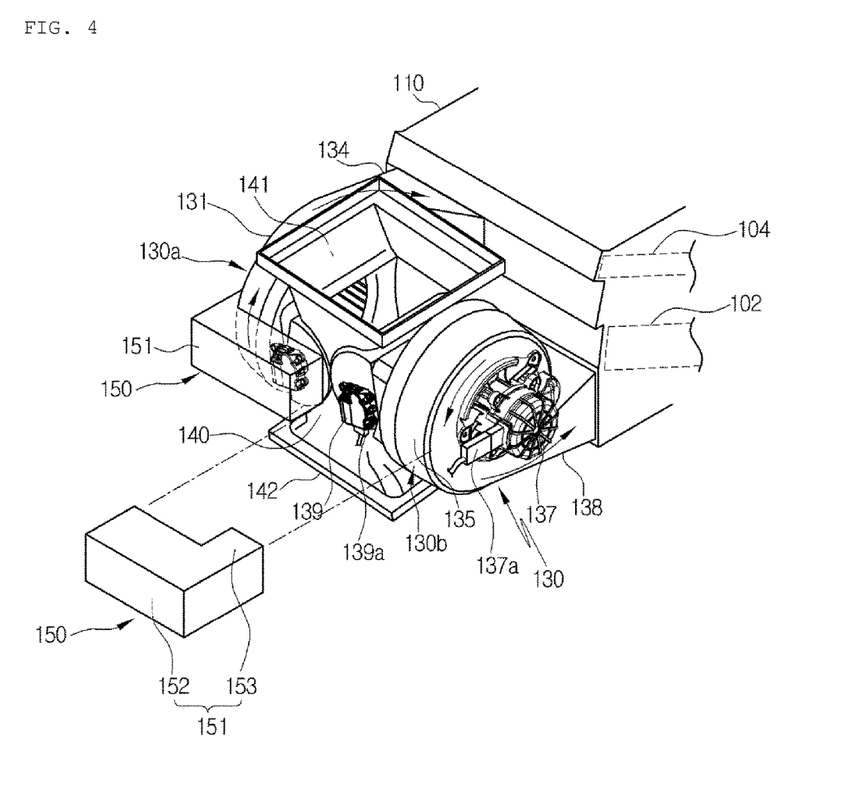
FIG. 4 is a partially perspective view showing a state where protecting means is mounted in the air conditioning system for a vehicle according to the preferred embodiment of the present invention.

As shown in FIG. 4, the protective cover 151 mounted on the outer surface of the blower unit 130 includes a first cover part 152 for surrounding the actuator 139, and a second cover part 153 for surrounding the cable connectors 133a and 137a respectively connected to the motors 133 and 137.

In this instance, the first cover part 152 surrounds not only the actuator 139 but also the actuator connector 139a connected to the side of the actuator 139.

Furthermore, the second cover part 153 may be formed to surround the entire of the motors 133 and 137, but preferably, is formed to surround only the cable connectors 133a and 137a.

As described above, if the protective cover 151 is mounted on the outer surface of the blower unit 130, the one protective cover 151 can surround and protect the actuator 139, the actuator connector 139a and the cable connectors 133a and 137a at once, and can prevent external foreign matters or water from entering into the electronic units to prevent malfunction and breakdown of the electronic units.

Additionally, because the one protective cover 151 surrounds a plurality of the electronic units, the air conditioning system for the vehicle according to the preferred embodiment of the present invention can protect a plurality of the electronic units and reduce assembling processes, weight and manufacturing costs by reducing the number of the protective covers 151.

In the drawing, two protective covers 151 are mounted on the outer surface of the blower unit 130. One protective cover 151 protects the actuator 139, which operates the first indoor and outdoor air converting door 147, and the actuator connector 139a, and the cable connector 133a of the motor 133, which operates the blast fan 132 of the first blower 130a, and the other protective cover 151 protects the actuator 139, which operates the second indoor and outdoor air converting door 148, and the actuator connector 139a, and the cable connector 137a of the motor 137, which operates the blast fan 136 of the second blower 130b.

Figure 3:
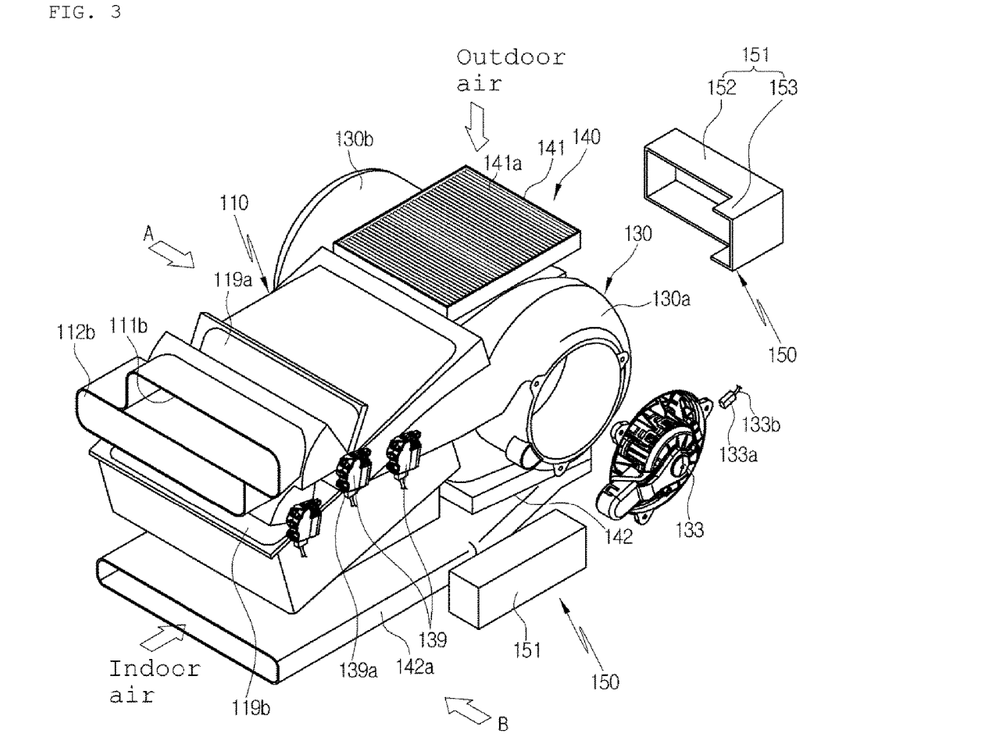
FIG. 3 is a perspective view showing an air conditioning system for a vehicle according to a preferred embodiment of the present invention.

In addition, as shown in FIG. 3, the protective cover 151 mounted on the outer surface of the air-conditioning case 110 surrounds a plurality of actuator 139.

In other words, a plurality of the actuators 139, which respectively operate the cold air mode door 120, the warm air mode door 121 and the bypass door 15, are mounted on the outer surface of the air-conditioning case 110, and one protective cover 151 surrounds a group of the actuators 139 at once.

In FIG. 3, it is illustrated that one protective cover 151 surrounds the two actuators 139, but it is also possible that one protective cover 151 is mounted to surround three actuators 139.

Figure 5:
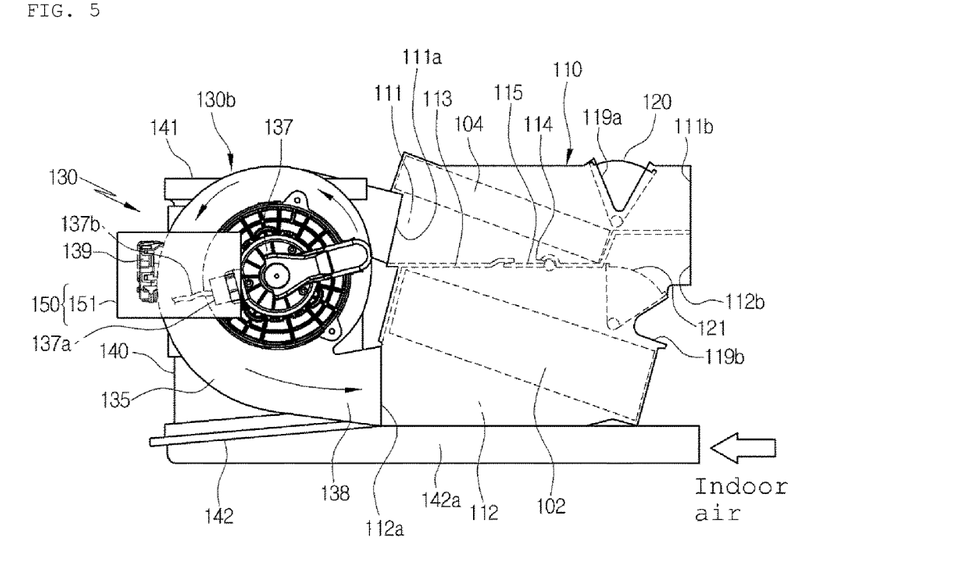
FIG. 5 is a partially perspective view showing a state where protecting means is mounted in the air conditioning system for a vehicle according to another preferred embodiment of the present invention.
Figure 6:
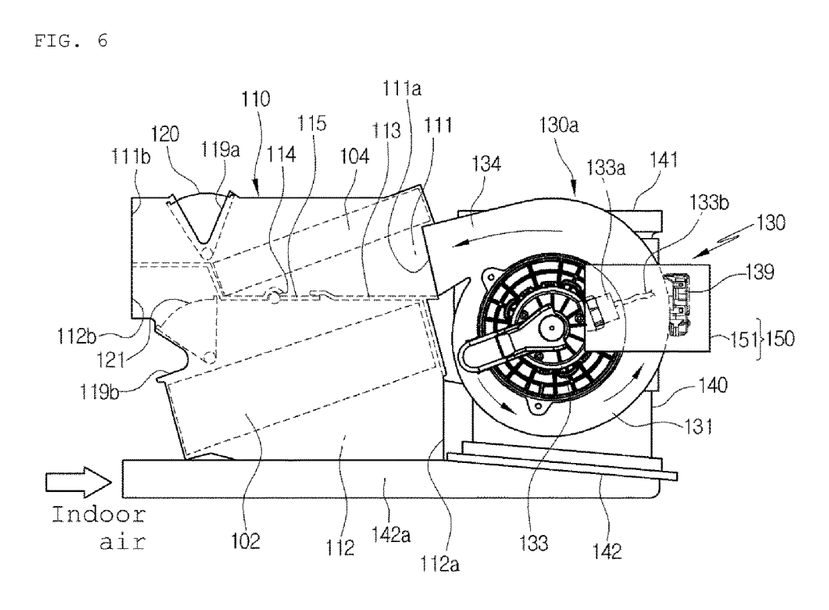
FIG. 6 is a side view seen from an A part of FIG. 3.
Figure 7:
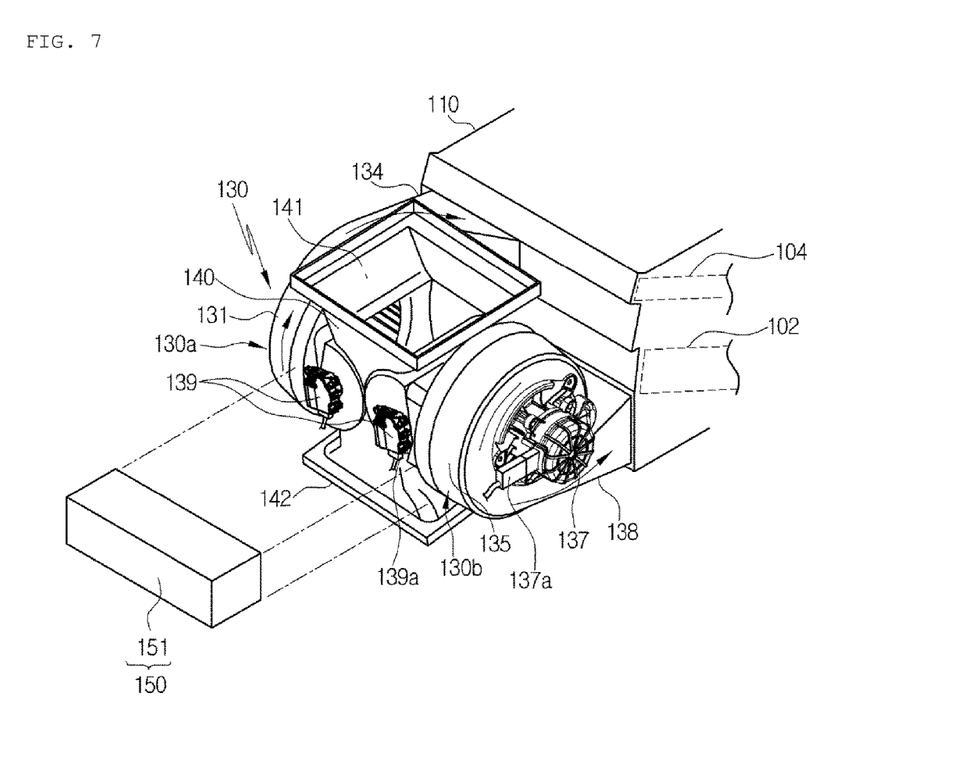
FIG. 7 is a side view seen from a B part of FIG. 3.

FIG. 5 illustrates protecting means 150 according to another preferred embodiment of the present invention. A plurality of actuators 139, which respectively operate the first indoor and outdoor air converting door 147 and the second indoor and outdoor air converting door 148, are mounted on the outer surface of the blower unit 130, and the protecting means 150 is mounted to surround the actuators 139 by just one protective cover 151.

Figure 8:
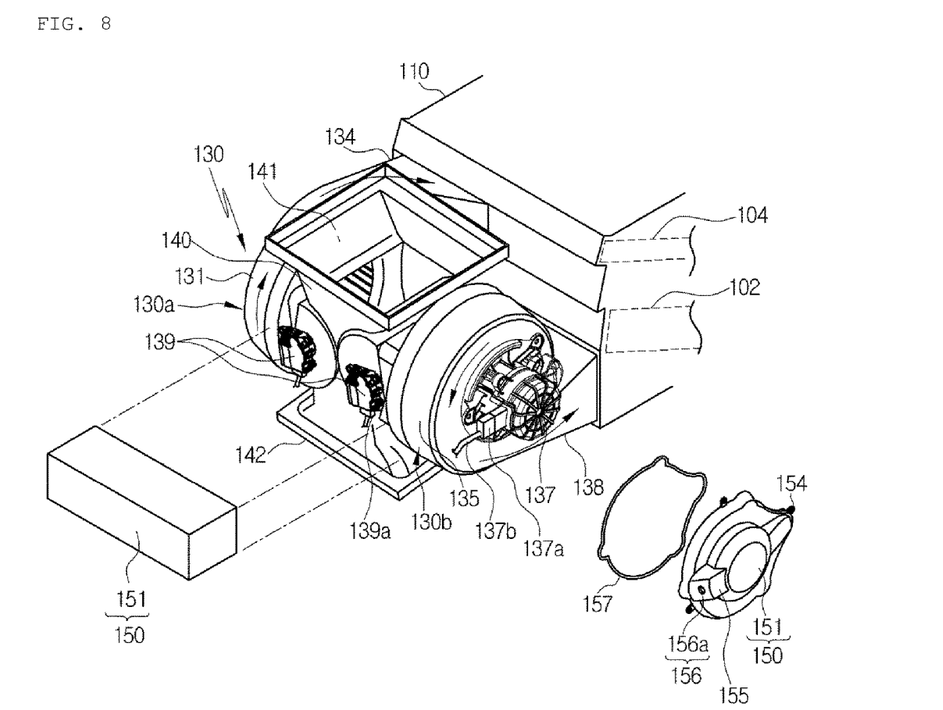
FIG. 8 is a partially perspective view showing protecting means according to a further preferred embodiment of the present invention.
Figure 9:
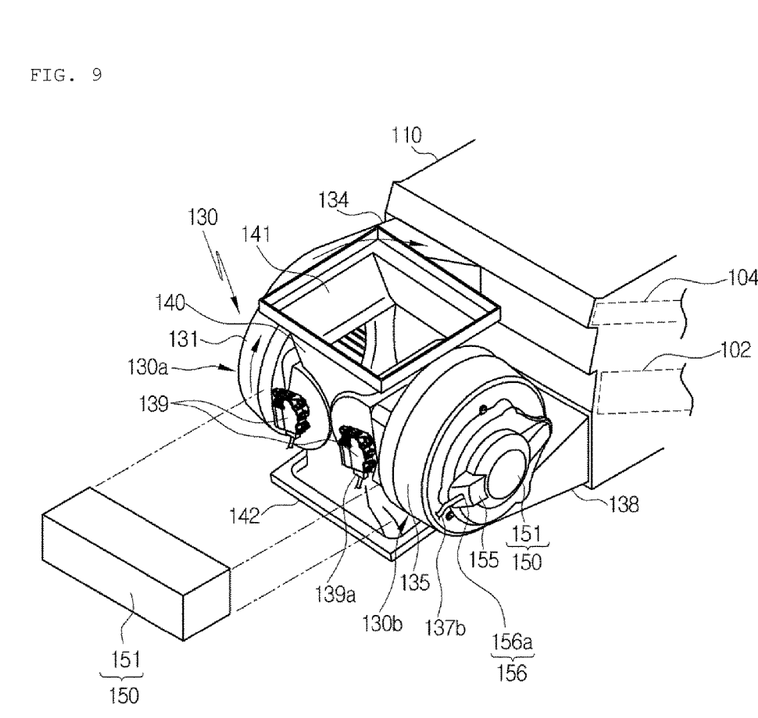
FIG. 9 is a partially perspective view showing a state where the protecting means is combined to a blower unit.

FIG. 8 illustrates protecting means 150 according to a further preferred embodiment of the present invention. The protecting means 150 is mounted to surround the electronic units and the cable connectors 133a and 137a by just one protective cover 151.

That is, the one protective cover 151 is mounted to surround the motors 133 and 137 and the cable connectors 133a and the 137a, which are electronic units.

Moreover, a sealing member 157 is mounted between the outer surface of the blower unit 130 and the protective cover 151 to seal a gap between the blower unit 130 and the protective cover 151.

In the meantime, besides the sealing member 157, a tongue-and-groove connection structure may be formed on the outer surface of the blower unit 130 and an assembled surface of the protective cover 151 to perform sealing.

Furthermore, the protective cover 151 has a receiving part 155 for receiving the cable connectors 133a and 137a, and a cable penetrating part 156, through which cables 133b and 137b of the cable connectors 133a and 137a pass, is formed at one side of the protective cover 151.

The cable penetrating part 156 is formed at one side of the receiving part 155.

Figure 10:
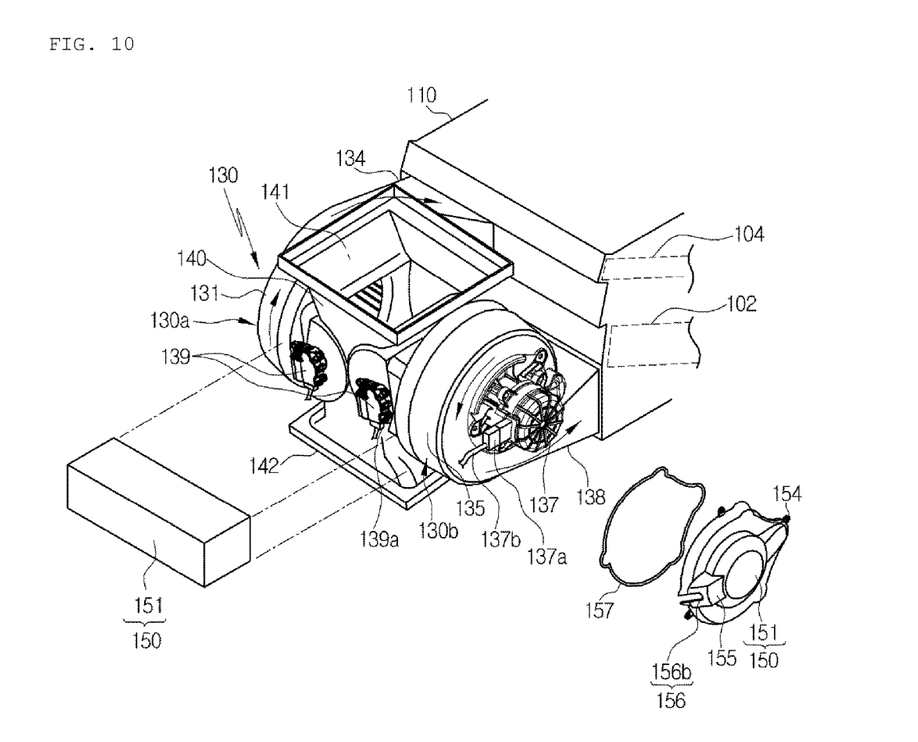
FIG. 10 is a perspective view showing a state where a cable penetrating part of FIG. 8 has a slot.

Additionally, the cable penetrating part 156 may have a through hole 156a formed in the protective cover 151 as shown pin FIG. 8, or may have a slot 156b which one side is opened at the edge of the protective cover 151 as shown in FIG. 10.

In addition, not shown in the drawings, but, the protective cover 151 may be mounted to surround the actuator 139, which is mounted on the outer surface of the air-conditioning case 110 or the blower unit 130, and the sensor connector (not shown) at once.

In the meantime, the drawings illustrate the protective cover 151 according to an exemplary embodiment of the present invention, but the protective cover 151 may have a connection structure (not shown) for a screw connection or a hook connection on the outer surface of the air-conditioning case 110 or the blower unit 130.

FIG. 8 illustrates that a screw connecting part 154 is formed on the protective cover 151 to connect the protective cover 151 to the outer surface of the blower unit 130 by a screw.

As described above, the protective cover 151 is mounted in order to protect the electronic units mounted on the outer surfaces of the air-conditioning case 110 and the blower unit 130, and in this instance, one protective cover 151 may be mounted to surround a single electronic unit or may be mounted to surround a group of a plurality of the electronic units at once.

Hereinafter, a refrigerant flowing process of the air conditioning system for the vehicle according to the preferred embodiments of the present invention will be described.

First, the vapor-phase refrigerant of high-temperature and high-pressure discharged after being compressed in the compressor is introduced into the condenser 102.

The vapor-phase refrigerant introduced into the condenser 102 exchanges heat with the air passing through the condenser 102, and in the above process, the refrigerant is liquefied while being cooled.

The liquid-phase refrigerant discharged from the condenser 102 is introduced into the expansion means to be decompressed and expanded.

The refrigerant decompressed and expanded in the expansion means becomes an atomized state of low-temperature and low-pressure and is introduced into the evaporator 104. The refrigerant introduced into the evaporator 104 exchanges heat with the air passing through the evaporator 104 to be evaporated.

After that, the refrigerant of low-temperature and low-pressure discharged from the evaporator 104 is introduced into the compressor, and then, recirculates the above-mentioned refrigeration cycle.

Hereinafter, air flow processes in the cooling mode, in the heating mode and in the heating mode under a low outdoor air temperature condition will be described.

A. Cooling mode

In the cooling mode, the cold air mode door 120 is operated to open the cold air outflow port 111b, and the warm air mode door 121 is operated to open the warm air discharge port 119b.

Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air and the outdoor are introduced into the intake duct 140 are respectively inhaled to the first blower 130a and the second blower 130b, and are respectively supplied to the cold air passageway 111 and the warm air passageway 112.

The air supplied to the cold air passageway 111 is cooled while passing through the evaporator 104, and then, is discharged to the interior of the vehicle through the cold air outflow port 111b in order to carry out cooling. In this instance, the air supplied to the warm air passageway 112 is heated while passing through the condenser 102, and then, is discharged to the exterior of the vehicle through the warm air discharge port 119b.

B. Heating mode

In the heating mode, the warm air mode door 121 is operated to open the warm air outflow port 112b, and the cold air mode door 120 is operated to open the cold air discharge port 119a.

Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air and the outdoor air introduced into the intake duct 140 are respectively inhaled to the first blower 130a and the second blower 130b, and then, are respectively supplied to the cold air passageway 111 and the warm air passageway 112.

The air supplied to the warm air passageway 112 is heated while passing through the condenser 102, and then, is discharged to the interior of the vehicle through the warm air outflow port 112b.

In this instance, the air supplied to the cold air passageway 111 is cooled while passing through the evaporator 104, and then, is discharged to the exterior of the vehicle through the cold air discharge port 119a.

C. Heating mode under a low outdoor air temperature condition

In the heating mode under the low outdoor air temperature condition, such as in extremely low temperature environment, the warm air mode door 121 is operated to open the warm air outflow port 112b, and the cold air mode door 120 is operated to open the cold air discharge port 119a.

Moreover, the bypass door 115 is operated to open the bypass passageway 114.

Furthermore, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air and the outdoor air introduced into the intake duct 140 are respectively inhaled to the first blower 130a and the second blower 130b, and then, are respectively supplied to the cold air passageway 111 and the warm air passageway 112.

The air supplied to the warm air passageway 112 is heated while passing through the condenser 102, and then, is discharged to the interior of the vehicle through the warm air outflow port 112b.

In this instance, the air supplied to the cold air passageway 111 is cooled by heat absorption of the evaporator 104 while passing through the evaporator 104, and then, is discharged to the exterior of the vehicle through the cold air discharge port 119a.

Additionally, some of the warm air heated while passing through the condenser 102 of the warm air passageway 112 is bypassed toward the cold air passageway 111 through the bypass passageway 114 to be supplied to the evaporator 104, so that air volume is flown into the evaporator 104 and temperature of the air flown into the evaporator 104 rises even in the extremely low temperature environment, thereby enhancing heating performance by increasing refrigerant temperature and pressure inside the air conditioning system and increasing temperature of the air discharged to the interior of the vehicle.

The invention claimed is:

1. An air conditioning system for a vehicle comprising:
    a blower unit mounted at an inlet of an air-conditioning case and including a first blower and a second blower in coaxial alignment with one another, an air inlet positioned axially between the first and second blowers, and indoor and outdoor air converting doors for selectively allowing the blower unit to blow indoor or outdoor air;
    the blower unit having a first outer surface and a second outer surface extending generally perpendicularly to one another;
    the first blower having a motor installed on the first outer surface of the blower unit to operate the first blower;
    cable connectors coupled with and extending from the at least one motor;
    at least one actuator installed on the second outer surface of the blower unit to operate the indoor and outdoor air converting doors;

a protecting cover mounted on the first and second outer surfaces of the blower unit, the protecting cover being a single integral cover having a first cover part surrounding the cable connectors and overlying the first outer surface of the blower unit, and a second cover part extending generally perpendicularly to the first cover part and from the first cover part and surrounding the actuator and overlying the second outer surface of the blower unit.

2. The air conditioning system according to claim 1, wherein the protective cover is formed to surround the at least one actuator and sensor connectors that connect to a sensor installed inside the blower unit.

3. The air conditioning system according to claim 1, wherein a seal is mounted between the outer surface of the blower unit and the protective cover.

4. The air conditioning system according to claim 1, wherein the protective cover has a receiving part for receiving the cable connectors, and
wherein a through hole, through which cables of the cable connectors pass, is formed at one side of the protective cover.

5. The air conditioning system according to claim 1, wherein a screw connecting part is formed on the protective cover to connect the protective cover to the outer surface of the blower unit by a screw.

6. The air conditioning system according to claim 1, wherein the air-conditioning case and the blower unit are arranged in an engine room of the vehicle.

7. The air conditioning system according to claim 1, wherein the air-conditioning case comprises a cold air passageway on which an evaporator is mounted, and a warm air passageway on which a condenser is mounted.

8. An air conditioning system for a vehicle comprising:
a blower nit mounted at an inlet of an air-conditioning case and including a first blower and a second blower in coaxial alignment with one another and an air inlet positioned axially between the first and second blowers, and indoor and outdoor air converting doors for selectively allowing the blower unit to blow indoor or outdoor air;
the first blower having a first motor and the second blower having a second motor with the first and second blower motors axially aligned with one another;
first cable connectors extending from the first blower and second cable connectors extending from the second motor;
a first actuator and a second actuator each overlying the air inlet axially between the first and second motors, the first and second actuators for operating the indoor and outdoor air converting doors; and
a first protecting cover generally having an L-shape and having a first cover part overlying and surrounding the first cable connectors and a second cover part extending from the first cover part and perpendicularly to the first cover part and overlying and surrounding the first actuator, and a second protecting cover generally having an L-shape and having a third cover part overlying and surrounding the second cable connectors and a fourth cover part extending from the third cover part and extending perpendicularly to the third cover part and overlying and surrounding the second actuator.

* * * * *